United States Patent
Hadar et al.

(10) Patent No.: US 11,138,312 B2
(45) Date of Patent: Oct. 5, 2021

(54) CYBER RANGE INTEGRATING TECHNICAL AND NON-TECHNICAL PARTICIPANTS, PARTICIPANT SUBSTITUTION WITH AI BOTS, AND AI BOT TRAINING

(71) Applicant: ACCENTURE GLOBAL SOLUTIONS LIMITED, Dublin (IE)

(72) Inventors: Eitan Hadar, Haifa (IL); Daniel Grabois, Tel Aviv (IL); Naomi Golad, Tel Aviv (IL); Elad Tapiero, Tel Aviv (IL)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 335 days.

(21) Appl. No.: 16/226,169

(22) Filed: Dec. 19, 2018

(65) Prior Publication Data
US 2020/0201992 A1    Jun. 25, 2020

(51) Int. Cl.
*G06F 21/56* (2013.01)
*G06N 20/00* (2019.01)
*G06N 5/02* (2006.01)
*G06F 30/20* (2020.01)

(52) U.S. Cl.
CPC .............. *G06F 21/56* (2013.01); *G06F 30/20* (2020.01); *G06N 5/022* (2013.01); *G06N 20/00* (2019.01); *G06F 2221/034* (2013.01)

(58) Field of Classification Search
CPC .. G06F 30/20; G06F 2221/034; G06F 21/577; G06N 20/00; G06N 5/022; G06N 3/006
See application file for complete search history.

(56) References Cited

U.S. PATENT DOCUMENTS

| 10,135,862 | B1* | 11/2018 | McClintock | H04L 63/1433 |
| 10,346,612 | B1* | 7/2019 | Donovan | G06F 21/554 |
| 10,600,335 | B1* | 3/2020 | Donovan | G09B 19/0053 |

(Continued)

OTHER PUBLICATIONS

H. Winter, "System security assessment using a cyber range," 7th IET International Conference on System Safety, incorporating the Cyber Security Conference 2012, Edinburgh, 2012, pp. 1-5. (Year: 2012).*

(Continued)

*Primary Examiner* — Robert B Leung
(74) *Attorney, Agent, or Firm* — Mannava & Kang, P.C.

(57) ABSTRACT

A cyber range system provides a cyber warfare training platform that integrates participation of technical (such as cyber defense personnel) and non-technical participants (such as executives or managers of an organization) within a simulation run, simulates missing participants with cross-contextual AI bots, and trains the bots in a simulated target network may be provided. The system may discover and simulate an organization's computer network so that personnel may be trained on a simulation that mimics their own network. The system may generate role bots that may each simulate a role of a participant. Each of these role bots may be computationally trained over the course of multiple simulation runs based on assessments of a training team that may moderate the simulation runs. Updated versions of the role bots may be stored in a data store for execution in the simulation run or future simulation runs.

20 Claims, 6 Drawing Sheets

(56) References Cited

U.S. PATENT DOCUMENTS

| | | | | |
|---|---|---|---|---|
| 2009/0208910 A1* | 8/2009 | Brueckner | ......... | G09B 19/0053 434/11 |
| 2009/0319249 A1* | 12/2009 | White | ................... | H04L 41/145 703/13 |
| 2012/0158395 A1* | 6/2012 | Hughes | ................. | H04L 41/145 703/21 |
| 2017/0304707 A1* | 10/2017 | Morton | ................. | G09B 9/003 |
| 2019/0028509 A1* | 1/2019 | Cidon | ..................... | H04L 51/32 |
| 2020/0104511 A1* | 4/2020 | Stolfo | .................... | H04L 67/38 |
| 2020/0177612 A1* | 6/2020 | Kras | .................. | H04L 63/1433 |

OTHER PUBLICATIONS

Cyber Ranges. NIST, National Initiative for Cybersecurity Education. 2018. Retrieved at https://www.nist.gov/system/files/documents/2018/02/13/cyber_ranges.pdf on Jan. 13, 2021. (Year: 2018).*

* cited by examiner

600

```
┌─────────────────────────────────────────────────────┐
│ Segment the received non-technical and technical    │
│ actions received during a simulation run to maintain│
│ contextual information of each action               │
│ 602                                                 │
└─────────────────────────────────────────────────────┘
                         │
                         ▼
┌─────────────────────────────────────────────────────┐
│ Label each of the actions for supervised machine    │
│ learning                                            │
│ 604                                                 │
└─────────────────────────────────────────────────────┘
                         │
                         ▼
┌─────────────────────────────────────────────────────┐
│ Populate benchmark and historian datastore with the │
│ labeled actions                                     │
│ 606                                                 │
└─────────────────────────────────────────────────────┘
                         │
                         ▼
┌─────────────────────────────────────────────────────┐
│ Train one or more bots based on the data in the     │
│ benchmark and historian datastore                   │
│ 608                                                 │
└─────────────────────────────────────────────────────┘
```

FIG. 6

CYBER RANGE INTEGRATING TECHNICAL AND NON-TECHNICAL PARTICIPANTS, PARTICIPANT SUBSTITUTION WITH AI BOTS, AND AI BOT TRAINING

TECHNICAL FIELD

This patent application relates generally to data security and data protection, and more specifically, to systems and methods for simulating cyber events using a holistic cyber range with artificial intelligence (AI) training based on participation from business and technical participants and cross-contextual conversation AI bots.

BACKGROUND

Cyberattacks and data breaches are becoming a more serious threat to individuals, organizations, and overall society. The number of attacks are also increasing at a rapid rate. Several conventional approaches have been used to combat data security problems. Among other approaches, conventional cyber warfare systems have been developed to simulate cyberattacks and responses. These and other conventional techniques are used to help improve responses to cyberattacks or data breaches.

A technical problem associated with conventional techniques for simulating cyber events is that they fail to integrate non-technical participants and technical participants to provide a complete simulation to prepare for, respond to, and process the aftermath of a cyberattack (such as performing cyber forensics after a cyberattack). Another technical problem arises because convention systems fail to account for participants that may be unable to participate. Another technical problem associated with conventional techniques for simulating cyber events is that they do not train and utilize a full range of Artificial Intelligence (AI) bots that can improve preparation, response, and aftermath processing.

As a result, a more robust and holistic approach may be needed to provide cyber warfare capabilities.

BRIEF DESCRIPTION OF DRAWINGS

Features of the present disclosure are illustrated by way of examples shown in the following figures. In the following figures, like numerals indicate like elements, in which:

FIG. 6 illustrates a method for computationally training AI bots for the cyber range, according to an example.

DETAILED DESCRIPTION

Figure 1:
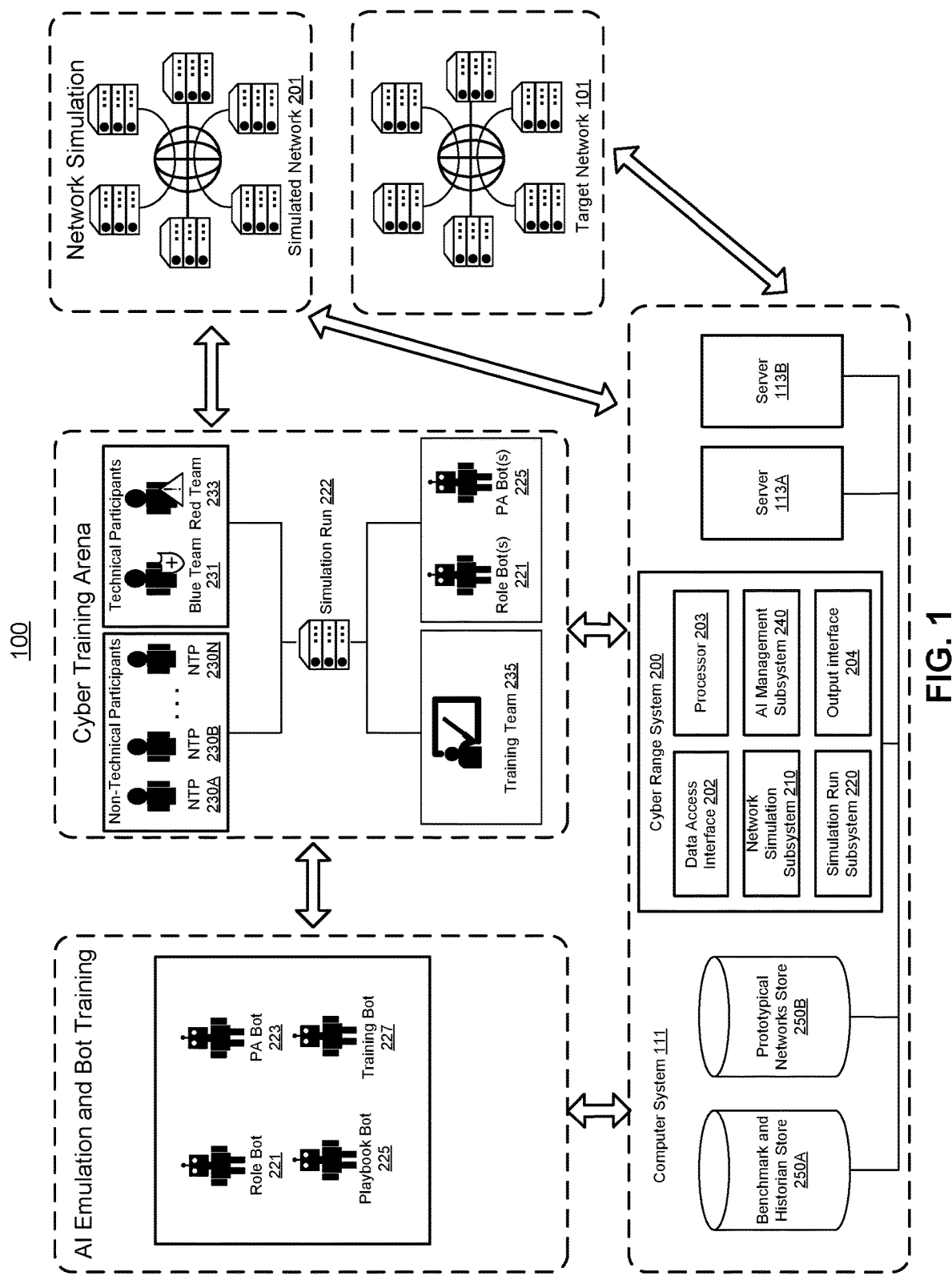
FIG. 1 illustrates an architecture for a cyber event training system, according to an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

As described above, cyberattacks and data breaches are becoming a more serious threat. The number of attacks are also increasing at a rapid rate. Several conventional approaches have been used to simulate cyber events and monitor responses to these simulated events. Conventional cyber ranges may provide a virtual environment for cyberwarfare training for technical personnel. However, they do not provide a holistic approach that simulates real-world conditions that integrates multiple types of stakeholders. For instance, in a real-world cyberattack scenario, multiple personnel, from non-technical stakeholders to technical stakeholders are involved in preparation, response, and aftermath (post-attack) operations. The decision of one group may impact the decisions of another group and vice versa. However, conventional cyber ranges typically focus on and train only one—usually technical—stakeholders and therefore do not provide a fully-immersive or comprehensive simulation experience. Furthermore, conventional cyber ranges do not account for missing or unavailable participants, such as a Chief Executive Officer (CEO) who is unavailable to participate (or if the organization being trained does not have a CEO, for example), nor do such cyber ranges utilize artificial intelligence (AI) technology to simulate missing participants, let alone conduct machine learning to train AI bots that can participate in simulations or advise personnel before, during, and/or after a real-world cyberattack.

According to examples described herein, a more robust and comprehensive cyber range system may be provided. The cyber range system described herein may provide a holistic virtual environment for cyberwarfare training and cybertechnology development, all of which may strengthen, stability, and secure performance of cyber infrastructures and information technology systems used by government, military, commercial, financial, and various enterprises.

The cyber range system, as described herein, may integrate technical and non-technical participants within a simulation run that simulates adversarial movements of both technical attacks, as well as non-technical interactions (such as received messages, phone calls, etc.) in association with a target network, simulates missing participants with cross-contextual AI bots, and trains the bots in a simulated target network. The cyber range system described herein may provide cyber warfare training for participants across a wide range of an organization's personnel, from non-technical stakeholders such as business leaders (e.g., C-suite personnel), marketers, legal personnel, and so forth, to technical stakeholders such as information technology personnel that take technical actions on the network infrastructure to respond to and/or prepare for cyberattacks. Each of these stakeholders may participate in the simulation run, whether in the same room or location or remotely in different locations. For example, a non-technical stakeholder may participate in the simulation run as a non-technical participant. Similarly, a technical stakeholder may participate in the simulation run as a technical participant.

Decision makers, such as managers and C-suite personnel, may simulate orchestration of business, operational, legal and marketing decisions in response to a cyber event. The decision makers may continuously respond to new technical and/or non-technical situations and problems in the simulation run, which may be affected by previous actions made by both a technical defending team, an automated or manual attack team, and/or moderation of one or more members of a training team.

Various types of participants may be simulated by an AI role bot, which may be computationally trained based on multiple, cross-contextual, simulation runs on a simulation of the target network or other networks to simulate a human role. AI role bots may participate in simulation runs to replace any human participants that may be unable to participate. The cyber range system may develop, train, and use other types of AI bots such as personal assistant bots that may advise human participants during a simulation run, playbook bots that are trained to provide advice for actual (real-world, non-simulated) cyber events, and training bots that facilitate training of the various types of AI bots.

An AI bot may refer to an AI program that automatically executes to perform one or more functions. Different types of AI bots may perform different functions such as simulating a technical or non-technical participant during a simulation run, advising a participant during a simulation run, advising a participant during a real-world cyber event, and/or performing other machine-learned functions described herein. The AI program may be computationally trained through machine learning (which may or may not be supervised) over multiple simulation runs depending on the particular function that the AI program performs. Although examples described herein may be directed to "AI bots," it should be appreciated that the term may include any variety or form of AI-based entity that is able to perform the functions described herein.

The cyber range system may enable businesses to train members and employees of an organization in a simulated cyber event in a holistic manner, binding non-technical and technical stakeholders. A simulated cyber event may include a simulation of a time before, during, and/or after a simulated cyberattack. A simulated cyber event may include one or more cyberattacks, which may come in a series, parallel, or other various sequence. Because the cyber range system is able to substitute participants with cross-contextual AI bots, any missing organizational stakeholders (who are unavailable to participate) may be replaced. Furthermore, the system may computationally train the AI bots to learn future responses according to domain-specific scenarios that may provide a contextual setting for machine learning. Thus, the AI bots may be computationally trained across contexts. For example, one scenario may relate to a technical context that includes a simulated cyberattack that employs lateral movements across a network to discover vulnerable computer systems or other targets. This example scenario may involve simulation and training of blocking the lateral movements by a technical defending team. Another scenario may include a technical context that includes a simulated cyberattack that employs phishing attacks. This example scenario may involve simulation and training of investigating first contamination by a technical defending team. Other types of technical contexts may be used in a scenario. An AI bot may therefore be computationally trained across technical contexts, including lateral movement, phishing, and/or other types of cyberattacks and attack vectors. Alternatively or additionally, an AI bot may be computationally trained across different non-technical contexts as well. For example, scenarios may include non-technical contexts, such as hypothetical questions posed to a non-technical participant relating to how that participant would handle a data breach resulting from a cyberattack. Some scenarios may include both technical and non-technical aspects. For instance, in the phishing example, human responses to a phishing attack may be simulated for the benefit of non-technical personnel, while investigation of the first contamination may be simulated for the benefit of the technical personnel. During a simulation run, the technical team may respond to a simulated cyberattack before, during, or after a simulated cyberattack using a simulated virtual model of a target network, such as an organization's network, and business processes associated with the organization.

In an example operation of the cyber range system, one or more data stores may store and manage data for a simulation run for cyber event training on a simulated network. The simulated network may simulate a target network such as an organization's computer network. The participants in the simulation run may include the organization's technical and non-technical personnel, a training team, an attacking (red) team, one or more AI bots, and/or others.

The cyber range system may generate the simulation run, which includes the simulated network. At least one technical participant and at least one non-technical participant may participate in the simulation run. The cyber range system may instantiate, within the simulation run, at least one role bot that simulates a non-technical participant or a technical participant. For example, the cyber range system may generate an instance of a role bot based on one or more trained inference functions for a role that corresponds to a technical and/or non-technical participant. In particular, the instance of the role bot may be a trained AI bot to simulate a non-technical participant, such as a C-suite executive, marketer, legal personnel, and so forth, and/or a technical participant, such as cyber security personnel that defends against cyberattacks.

During the simulation run, the cyber range system may generate one or more automated attacks in the simulation run. In some examples, the automated attacks may be based on one or more scenarios provided by a member of a training team that serves as a moderator of the simulation run and/or may be initiated by a member of the red (attacking) team.

The cyber range system may receive various actions during the simulation run from various participants. The cyber range system may use each action to update the simulation run. As such, the action from one participant may impact the simulation run and affect the other participants. For example, the actions of a non-technical participant may impact other non-technical participants and/or technical participants. Similarly, the actions of a technical participant may impact other technical participants and/or non-technical participants.

The cyber range system may provide, such as via a data access interface, an indication of one or more of the actions made during the simulation run to a training team. The training team may assess the actions and determine whether the actions were appropriate and/or a level of appropriateness of the actions. For instance, the training team may label or tag the actions with one or more assessments used for machine learning.

The cyber range system may update at least one AI bot based on the assessment. The AI bot that is updated may include the AI role bot instantiated in the simulation run, another role bot, or other bot. For example, the action and the assessment may be used in supervised machine learning. In a particular example, the cyber range system may use the action and the assessment to form an input-output pair for supervised machine learning. The input-output pair may be analyzed with other input-output pairs to generate one or more inference functions that may be used to learn actions that should be taken given a similar context.

The output interface of the cyber range system may transmit the updated AI bot for execution in the simulation run or a subsequent simulation run. For example, the output interface may update the benchmark and historian store with the updated inferences that were learned based on supervised training for the AI bot.

FIG. 1 illustrates an architecture for a cyber event training system 100, according to an example. The cyber event training system 100 may be used to conduct one or more cyber warfare simulations to train participants or users as well as computationally train AI bots. It should be appreciated that the term "computationally train," as used herein, may be distinguished from the concept of cyber warfare training for human participants. While the cyber event training system 100 may be used to train participating humans to prepare for, respond to, and/or process the aftermath of cyberattacks, the system 100 may also computationally train AI bots by performing machine learning on data gathered from the simulations, including data relating to actions taken by the human participants and the results of those actions in the simulation, to develop and update AI bots.

The cyber event training system 100 may operate in a computer environment, such as a local computer network or a cloud-based computer network. The cyber event training system 100 may provide a training environment that simulates an entity's network for training different verticals, such as technical and non-technical stakeholders, of an entity to respond to or anticipate a cyber event using a simulation of the entity's network. The training environment may include various aspects that facilitate cyber warfare training that integrates training of both technical and non-technical stakeholders and computational training of automated AI bots, as well as the use of AI role bots that may play a technical or non-technical role.

The cyber event training system 100 may include a computer system 111 that facilitates AI emulation and bot training, a cyber training arena, and network simulation. AI emulation and bot training may generate and computationally train various types of AI bots, such as a role bot 221, a Personal Assistant ("PA") bot 223, a playbook bot 225, a training bot 227, and/or other types of AI bots. As previously described, an AI bot may refer to an AI program that automatically executes and may be computationally trained through machine learning (which may or may not be supervised) over multiple simulation runs. That is, the AI program may correlate data inputs, such as cyber event data, with data outputs, such as outcomes of actions taken in response to or in anticipation of the cyber event data in a simulation run. The outcomes may include annotations or labels assigned to the actions by a training team that moderates each simulation run. These labels may indicate whether or not the action being labeled was appropriate to take, given the cyber event data. In some examples, these labels may be based on a scoring scale that indicates the appropriateness of the action. As such, AI bots may be refined over time to learn appropriate actions that should be taken or advice should be given depending on observed data and depending on the particular set of functions they provide. For instance, a role bot 221 may include an AI bot that simulates a participant by playing a technical or non-technical role during a simulation run 222, a PA bot 223 may include an AI bot that may advise a participant during the simulation run 222, a playbook bot 225 may include an AI bot that may advise a stakeholder during a real-world cyber event, and a training bot 227 may include an AI bot being computationally trained.

A role bot 221 may be configured to simulate a technical or non-technical role. For example, a role bot 221 may be instantiated and executed in the simulation run 222 to take the place of or otherwise simulate the actions of a participant during a simulation run. In this manner, even if a full set of participants is unavailable to participate in a given simulation run, the cyber range system 200 may execute with role bots 221 that take the place of a missing participant. Alternatively or additionally, a role bot 221 may be instantiated and executed in the simulation run 222 for training purposes to gauge and train the actions of other technical or non-technical participants responsive to the actions of the role bot 221. The training team 235 or others may cause a role bot 221 to be instantiated and executed during the simulation run. For example, the training team 235 may cause a role bot 221 to be instantiated and executed when configuring the simulation run and/or at runtime.

A PA bot 223 may be instantiated and executed to provide guidance for participants. For example, the PA bot 223 may be instantiated and executed on a device of a participant and may interface with the simulation run. In this manner, the PA bot 223 may have contextual awareness of the events in the simulation run, including the domain of scenarios described herein.

A playbook bot 225 may be instantiated and executed to provide actions to take in response to cyber events. The playbook bot 225 may operate in a production network, such as the target network 101. In other words, the playbook bot 225 may be trained through various simulation runs and executed in a production network for real-world preparation, response, and post-attack operations. In some examples, the playbook bot 225 may operate as a general question-and-answer bot that can provide answers to questions relating to cyberattacks outside of an actual or simulated cyber event. In these examples, the playbook bot 225 may serve as a point of knowledge based on its computational training.

A training bot 227 may refer to a bot that is being trained. For example, the training bot 227 may, when trained, may be instantiated as one of the other bots.

The computer system 111 may include a variety of servers 113a and 113b that facilitate, coordinate, and manage information and data. For example, the servers 113a and 113b may include any number or combination of the following servers: exchange servers, content management server, application servers, database servers, directory servers, web servers, security servers, enterprise servers, and analytics servers. Other servers to provide a cyber range may also be provided.

It should be appreciated that a single server is shown for each of the servers 113a and 113b, and/or other servers within the systems, layers, and subsystems of the cyber event training system 100. However, it should be appreciated that multiple servers may be used for each of these servers, and the servers may be connected via one or more networks. Also, middleware (not shown) may include in the cyber event training system 100 as well. The middleware may include software hosted by one or more servers. Furthermore, it should be appreciated that some of the middleware or servers may or may not be needed to achieve functionality. Other types of servers, middleware, systems, platforms, and applications not shown may also be provided at the back-end to facilitate the features and functionalities of the cyber event training system 100.

The benchmark and historian store 250A may include a datastore that may store information and data associated with execution of simulation runs 222, and may be used to computationally train AI bots and store models for generating the trained AI bots. For example, the benchmark and historian store 250A may be one or more repositories of actions taken by participants, assessments made by the training team 235, input-output pairs for supervised machine-learning, inference functions for each AI bot, scenarios 224 (illustrated in FIG. 2), and/or other data generated or used by the cyber event training system 100. Other data stores may also be provided in the computer system 111, such as data marts, data vaults, data warehouses, data repositories, etc.

The Prototypical Networks Library Store 250B may include a datastore that may store information and data associated with generating generic networks for general training. The data in the Prototypical Networks Library Store 250B may include, for example, templates that each may be used to model simulate generic networks. Thus, instead of or in addition to discovering and simulating an actual network for cyber training, a generic network may be simulated for general training purposes using data from the Prototypical Networks Library Store 250B. In these examples, the training team 235 or others may select specific types or configurations of generic networks for training on those types or configurations of networks.

Participation in the simulation run 222 by the simulation participants may be handled in various ways. For example, all or some of the participants may participate within the same physical space, in which case they may communicate in real-time with one another without the need for a computer interface to record such communication. In some instances, at least some of the participants may be remote from other ones of the participants, who may communicate with one another via a comm interface 202A provided by the data access interface 202. The comm interface 202A may include an interface for exchanging video, voice, text, and/or other inputs. In either instance, the data access interface 202 may receive and/or store inputs from various participants. In some of these examples, the data access interface 202 may share inputs from one participant to another participant for communication purposes, as will be described in more detail with respect to FIG. 2 below.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The cyber range system 200 may include various layers, processors, systems or subsystems. For example, the cyber range system 200 may include a data access interface 202, a processor 203, network simulation subsystem 210, a simulation run subsystem 220, and an AI management subsystem 240, and an output interface 204. Other layers, processing components, systems or subsystems, or analytics components may also be provided. A simulation run 222 may be executed in various computing environments. For example, the cyber range system 200 may execute on an organization's computer systems, on a cloud-based platform provided by a Cloud Service Provider ("CSP"), on a hosted system that provides services to the organization, and/or other computer systems.

There may be many examples of hardware that may be used for any of the servers, layers, subsystems, and components of the cyber range system 200 or the cyber event training system 100. For example, the processor 203 may be an integrated circuit, and may execute software or firmware or comprise custom processing circuits, such as an application-specific integrated circuit (ASIC) or field-programmable gate array (FPGA). The data access interface 202 and output interface 204 may be any number of hardware, network, or software interfaces that serves to facilitate communication and exchange of data between any number of or combination of equipment, protocol layers, or applications. For example, the data access interface 202 and output interface 204 may each include a network interface to communicate with other servers, devices, components or network elements via a network in the cyber event training system 100. The subsystems of the cyber range system 200 may provide respective functions. More detail of the cyber range system 200 and the respective functions is provided in FIG. 2.

Figure 2:
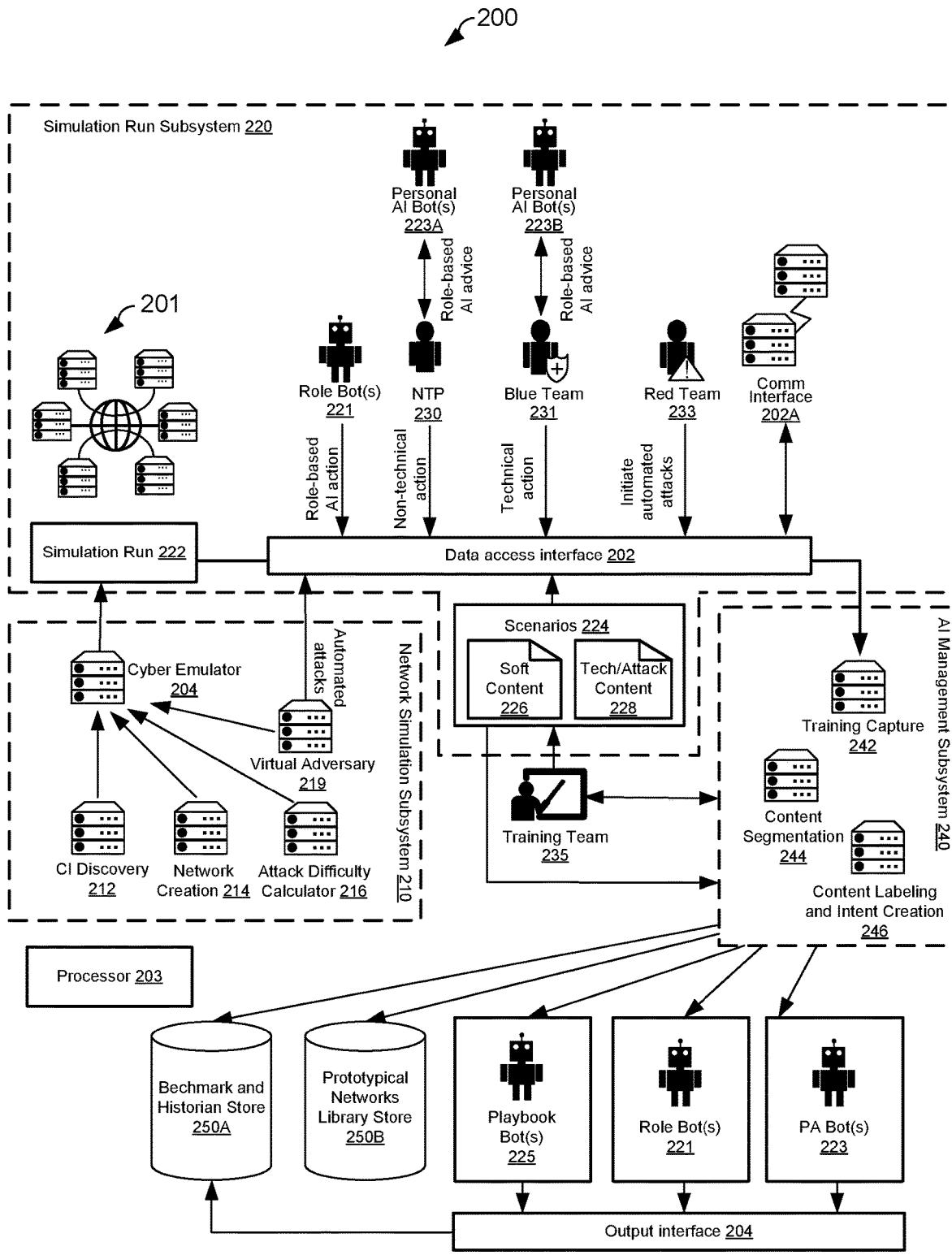
FIG. 2 illustrates an example of components in a cyber range system, according to an example.

FIG. 2 illustrates an example of components and data flows in the cyber range system 200, according to an example. Although the cyber range system 200 shown in FIG. 2 is depicted in an integrated manner, it should be appreciated that the cyber range system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. In an example, the cyber range system 200 may be an integrated system as part of the computer system 111 shown in FIG. 1.

The network simulation subsystem 210 may include various components that simulate the target network. For instance, the network simulation subsystem 210 may include Configuration Item (CI) discovery 212, network creation 214, an attack difficulty calculator 216, a cyber emulator 218, a virtual adversary 219, and/or other components.

The CI discovery 212 may discover the computer infrastructure components, network topology, configurations, security policy, and/or other parameter of the target network, including information technology or operational technology assets. The CI discovery 212 may include automated and/or manually processes based on input from the target network administrators. Various CI discovery tools may be used, including, without limitation, tools from Nozomi Networks™, Claroty™, ForeScout®, and others. Output of the CI discovery 212 may be provided for network creation 214.

The network creation 214 may recreate the network based on the output of the CI discovery 212. For instance, the network creation 214 may generate a computational model of the target network based on the computer infrastructure components, network topology, configurations, security policy, and/or other parameter of the target network from the CI discovery 212.

The attack difficulty calculator 216 may determine a level of difficulty for automated attacks and/or the level of security of the target network. In some examples, the attack difficulty calculator 216 may assess a level of difficulty of attacking the target network. For instance, the attack difficulty calculator 216 may generate an attack graph that models lateral movements between components discovered during CI discovery 212, thereby indicating a potential structure of the components. Each path on the attack graph may model a path from one component to the next. Each path may be assigned with an attack difficulty level that indicates a level of difficulty of the path. Each component on a path may be assigned with an attack difficulty level. The output of the attack difficulty calculator 216 may be used to model attacks on the simulated target network during a simulation run.

The cyber emulator 218 may generate the simulated target network 211. For example, the cyber emulator 218 may obtain the network parameters generated by the CI discovery 212 and Network Creation 214. It should be noted that, in some examples, the simulated network may be a generic network that may be used for generic training. In these examples, a predefined set of network parameters may be obtained from the prototypical networks library store 250B. In this sense, the target network 101 that is simulated may include the generic network. As such, the generic network may be used instead of (or as a supplement to) the target network 101 in the examples described throughout this disclosure.

The virtual adversary 219 may include an automated set of cyber events that may be directed against the simulated target network 211. For example, the virtual adversary 219 may include program instructions that direct lateral movement within the simulated target network. In this example, the virtual adversary 219 may simulate lateral movement through the simulated virtual network 211 to explore security vulnerabilities at various components of the network, which simulates the action of an actual malicious actor attempting to exploit an actual network. In particular, the virtual adversary 219 may attempt to gain access to different components of the simulated virtual network 211 by traversing network linkages from a component to which the virtual adversary 219 has gained access (such as through breach of a security control for that component) to other components of the simulated virtual network 211. These and other types of cyber events may be made through the data access interface 202, which provides the events to the simulation run subsystem 220 for updating the simulation run 222. The participants may be notified of this activity or otherwise discover the activity based on the updated simulation run 222. Other types of automated cyber events may be used as well or instead of lateral movement events. It should be noted that the simulation run 222 may be used for training for situations before, during, and after one or more cyber events. In this manner, the simulation run 222 may include the actions of participants before, during, and/or after one or more cyber events have been simulated in the simulation run 222. As such, the simulation run 222 may model cyberattack readiness, response, and/or aftermath.

Once the simulated target network 211 has been generated, the simulation run subsystem 220 may execute a simulation run 222 based on the simulated target network 211. For example, the simulated target network 211 may include model parameters for the network that, when instantiated by the simulation run subsystem 220, simulates the network from which the simulated target network 211 was derived. The simulation run subsystem 220 may execute the simulation run 222 on the computer system 111, on a target network 101, on a cloud-based platform, which may be provided by a Cloud Service Provider, and/or other physical or virtual computer system(s).

The simulation run subsystem 220 may receive inputs relating to the simulation run 222 from various participants via the data access interface 202. For example, the simulation run subsystem 220 may receive inputs prior to executing the simulation run 222 so that the simulation run is pre-configured based on the inputs. In some examples, the input may include one or more scenarios 224. The scenarios 224 may be received from a member of the training team 235 before, during, or after a cyber event has been executed in the simulation run 222. As previously noted, each scenario 224 (and the content therein) may be a domain-specific scenario. As such, the scenarios 224 provided by the training team 235 during a simulation run 222 may be context-specific according to the domain.

The scenarios 224 may each include soft content 226, tech/attack content 228, and/or other content. The soft content 226 may include questions to be directed to one or more participants of the simulation run 222. In some examples, the soft content 226 may include assessment data for assessing any responses from a participant to which the soft content was directed. The assessment data may include ideal response data or other data that may be used to assess the response.

In some examples, the tech/attack content 228 may include data relating to an attack on the simulated target network 211. For instance, the tech/attack content 228 may specify certain actions that the simulation run subsystem 220 should simulate in the simulation run 222. Such actions may include, without limitation, spam-like attacks that cause spam or phishing correspondence to be simulated, code injection attacks on simulated websites and/or on other attack surfaces, denial of service style attacks that are directed to the target virtual network 211, brute force attacks on simulated systems, and/or other types of attacks that may be aimed at degrading performance, stealing data and information, hampering privacy, encrypting systems for ransom, and so forth. In these examples, the simulation run subsystem 220 may preconfigure the simulation run 222 with the scenarios. The simulation run subsystem 220 may update the simulation run 222 based on the inputs. Thus, the simulation run 222 may be interactively updated as inputs are received so that the impact of the inputs on the simulation may be assessed and provided for training one or more of the participants.

In some examples, the simulation run subsystem 220 may receive inputs via the data access interface 202 during the simulation run 222. The inputs may include one or more scenarios 224 from a member of the training team 235, a role-based action from a role bot 221, a non-technical action from a NTP 230, a technical action from a member of the blue (defending) team 231, an action from a member of the red (attacking) team 233, and/or other actions or updates to the situation run 222.

In some examples, the training team 235 may, during the simulation run 222, provide scripted scenarios 224 to be executed as an input. In this manner, training team 235 may provide custom scenarios 224 based on the updates to the simulation run 222 as the simulation run is executed.

In some examples, a role bot 221 may simulate the role of a participant. For instance, a role bot 221 may simulate a non-technical participant or a technical participant. Each role bot 221 may be trained according to machine learning disclosed herein, which may be specific to the type of role that the role bot 221 will play. As multiple simulation runs 222 are accumulated and the training of role bot 221 is continuously refined, the role bot 221 may be executed as a playbook bot that executes in a production network.

In some examples, a NTP 230 may provide a non-technical action as an input to the simulation run 222. The non-technical action may include a response to soft content 226 such as a scripted question from a scenario 224, a communication to another participant such as another NTP 230 or blue team 231, and/or other inputs that a NTP 230 may take.

In some examples, an NTP 230 may be provided with a PA bot 223A. The PA bot 223A may execute on a device of the NTP 230 and/or via an interface of the simulation run subsystem 220. In either example, the PA bot 223A may be executed by the simulation run subsystem 220 for use by the NTP 230. In some examples, the PA bot 223A may include a user interface such as a voice interface, a graphical user interface, and/or other type of interface through which the NTP 230 may interact with the PA bot. For example, the PA bot 223A may receive queries from NTP 230 regarding a particular action that should be taken to prepare for, respond to, or post attack operation in response to a cyberattack. The PA bot 223A may provide advice or other instruction to the NTP 230 during the simulation run 222 based on learned parameters that were trained in previous simulation runs. In this respect, the PA bot 223A may represent a cross-contextual conversation AI bot that learns from previous simulation runs (each having a different context) to determine actions that should be taken by a particular role of the NTP 230. Thus, the AI bot 223A may be trained specifically for a particular non-technical role (such as a CEO role, CTO role, legal role, marketing role, and the like).

In some examples, a member of the blue team 231 may provide a technical defensive action as an input to the simulation run 222. The blue team 231 may include one or more human participants that are tasked with simulating technical defensive actions on a network. A simulated technical defensive action may include a simulated technical act that includes a defensive counter-measure that a defending team may take to prevent, mitigate, respond to, or otherwise counter a cyberattack. In some examples, a member of the blue team 231 may provide non-technical actions similar to those provided by a NTP 230. For example, the blue team 231 may provide responses to scripted questions, communications to other participants, and/or other inputs that a NTP 230 may provide, although the non-technical inputs from the blue team 231 will relate to a technical defensive action (such as an answer to a question that asks what action should be taken in response to a cyberattack).

In some examples, a member of the blue team 231 may be provided with a PA bot 223B, which may execute in a manner similar to the PA bot 223A (that is, on a device of the a member of the blue team 231 and/or via an interface of the simulation run subsystem 220). The PA bot 223B may be computationally trained to provide advice to a member of the blue team 231 based on prior actions of blue team members from previous simulation runs and corresponding assessments of those actions.

In some examples, a member of the red team 233 may provide a technical attack action as an input to the simulation run 222. The red team 233 may include one or more human participants that are tasked with simulating cyberattacks on a network. The technical attack action may simulate a cyberattack on a network. In some instances, different members of the red team 233 may launch coordinated simulated attacks on the simulated target network 211 during the simulation run 222. In some instances, a member of the red team 233 may launch simulated attacks in conjunction with scripted attacks from the tech/attack content 228 of one or more scenarios 224. In this manner, a live (human) team of attackers may provide the blue team 231 and the NTP 230 with dynamic attack conditions in the simulation run 222 to prepare for, respond to, and/or perform post-attack recovery operations. These and other actions may be assessed by the training team 235 for computationally training the AI bots, as well as providing assessments for human participants.

The AI management subsystem 240 may include various components that generate, train, and refine the AI bots. For instance, the AI management subsystem 240 may include a training capture 242, content segmentation 244, content labelling and intent creation 236, and/or other components. The training capture 242 may capture actions and other data during the simulation run 222. The captured data may be in the form of audio (such as spoken words), text, commands, configurations, and/or other actions that may be taken on a target network 101.

The content segmentation 244 may assign content received from the training capture 242 with contextual information so that the content may be assessed in context. The contextual information may include an indication of the domain to which a scenario 224 relates, information that describes the circumstances of the content, and/or other information that provides a contextual setting for the data. For instance, various actions from participants may be assigned a domain of the scenario 224 played out by the simulation run 222. Alternatively or additionally, various actions from participants may be assigned with information surrounding the actions taken, such as a cyberattack to which the action responds, a previous communication from another participant, the status of the simulated target network 211, and/or other context-providing information. In this manner, the content, such as actions from various participants, may be assessed with contextual information, and context-aware bots may be trained accordingly. Furthermore, AI bots may be trained across-contexts, facilitating a greater probability of providing appropriate responses according to the particular context in which a decision is to be made.

In some examples, the AI management subsystem 240 may provide the captured content to the training team 235 for assessment. The captured content may be provided with contextual information described above. The training team 235 may review the captured content and provide assessment information for the content. The assessment information may include an assessment by the training team 235 of the appropriateness of the content, such as an action by a participant, given the state of the simulation run 222. The assessment information may include, for example, a binary assessment (such as yes—appropriate or no—not appropriate) or may include levels such as a scale of appropriateness or scale of appropriateness. The content labeling and intent creation 236 may receive the assessment information from the training team 235 (which may be via the data access interface 202), and store the assessment along with the content and any contextual information in the benchmark and historian store 250A. As previously noted, the benchmark and historian store 250A may store data relating to a history of simulation runs executed by the cyber range system 200 and/or other data such as bootstrap data for machine-learning and computational training.

In some examples, the AI management subsystem 240 may perform machine learning on the data from the benchmark and historian store 250A. For example, the content in the benchmark and historian store 250A may be stored in association with contextual information and assessment information. The AI management subsystem 240 may link a given action by a participant (the content) with the appropriateness of the action specified in the assessment information for that action. In this sense, the action from a participant and its assessment (of appropriateness) by member of the training team 235 may be used as an input-output pair for supervised machine learning. Based on multiple input-output pairs, the AI management subsystem 240 may train an AI bot. For example, the AI management subsystem 240 may generate one or more inferred functions that infer appropriate actions to take based on new or different contextual data. In this way, the inferred functions may take as input new contextual data and output an inferred action to take based on the observed input-output pairs accumulated over multiple simulation runs. The inferred functions may be tested and validated on test data for which the outcomes are known in order to validate the performance of the inferred functions. Once validated, the inferred functions may be applied by (or for) the various bots described herein. For example, the inferred functions learned from actions by a NTP 230 may be used to update a model executed by a PA bot 223A, a role bot 221 that plays the same role as the NTP 230, or a playbook bot 225. Similarly, the inferred functions learned from actions by a member of the blue team 231 may be used to update a model executed by a PA bot 223B, a role bot 221 that plays the same role as the member of the blue team 231, or a playbook bot 225 that can advise technical teams. The update process may be iterative such that the bots may be periodically trained to learn appropriate actions to take under different circumstances.

Figure 3:
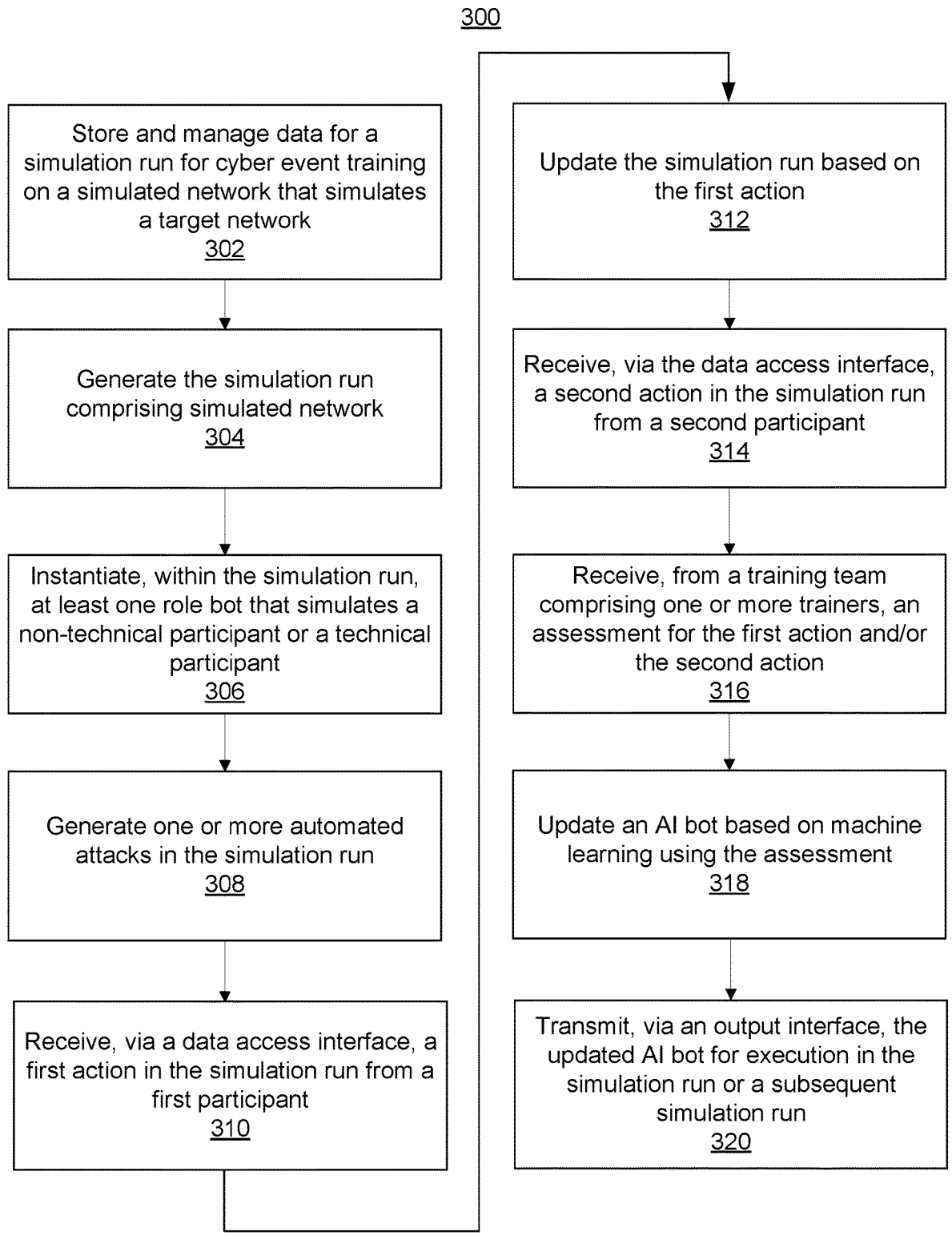
FIG. 3 illustrates a method for generating a cyber range with participation from non-technical, technical, and AI bots, according to an example.

FIG. 3 illustrates a method 300 for executing a cyber range with participation from non-technical, technical, and AI bots, according to an example. The method 300 is provided by way of example, as there may be a variety of ways to carry out the method described herein. Although the method 300 is primarily described as being performed by system 100 as shown in FIG. 1 or system 200 as shown in FIGS. 1-2, the method 300 may be executed or otherwise performed by other systems, or a combination of systems. Each block shown in FIG. 3 may further represent one or more processes, methods, or subroutines, and one or more of the blocks may include machine-readable instructions stored on a non-transitory computer readable medium and executed by a processor or other type of processing circuit to perform one or more operations described herein.

At 302, one or more data stores 250 may store and manage data for a simulation run 222 for cyber event training on a simulated network 201 that simulates a target network 101.

At 304, the cyber range system 200 may generate the simulation run 222 comprising simulated network 201. A plurality of participants including at least one technical participant and at least one non-technical participant may participate in the simulation run 222.

At 306, the cyber range system 200 may instantiate, within the simulation run 222, at least one role bot 221 that simulates a non-technical participant 230 or a technical participant (such as a member of the blue team 231).

At 308, the cyber range system 200 may generate one or more automated attacks in the simulation run. In some examples, the automated attacks may be based on one or more scenarios provided by a member of a training team 235 that serve as a moderator of the simulation run 222. In some examples, the automated attacks may be initiated by a member of the red team 233.

At 310, the cyber range system 200 may receive a first action in the simulation run 222 from a first one of the plurality of participants, the first action responsive to the one or more automated attacks. For example, a member of the blue team 231 may execute an action in the simulation to reduce ways to attack a simulated target machine that contains sensitive data, such as by removing vulnerabilities in simulated machines that can access the target machine.

At 312, the cyber range system 200 may update the simulation run 222 based on the first action. For example, the cyber range system 200 may apply the first action as an input to a network model on which the simulated network 201 is based. The network model may then update its state based on the applied input, thereby updating the simulated network 201 in the simulation run 222. For example, the simulated target machine may be updated based on the action of the member of the blue team 231.

At 314, the cyber range system 200 may receive a second action in the simulation run 222 from a second one of the plurality of participants, the second action in response to the updated simulation run. Continuing the above example, a NTP 230 such as a legal person and/or a finance person may simulate informing the stock exchange that the cascading effect of the attack is blocked, and further damage is stopped. It is noted that although an example of a technical participant's action and its effect on a non-technical participant is described with respect to FIG. 3, an action by a non-technical participant and its effect on a technical participant may be simulated as well.

At 316, the cyber range system 200 may receive, from a training team 235 comprising one or more trainers, an assessment for at least one of the first action and the second action. The assessment may indicate an appropriateness of the first action and/or the second action.

At 318, the cyber range system 200 may update at least one AI bot based on the assessment. The AI bot that is updated may include the role bot 221 instantiated in the simulation run, another role bot 221, or other bot. For example, the AI bot that was updated may be one that plays a role that is played by a participant that provided the action that was assessed. In particular examples, the first action may have been from a NTP 230. A role bot 221 that plays a non-technical role or other AI bot may be updated based on the first action and the assessment of the first action based on machine learning techniques, such as supervised machine learning techniques described herein. In other particular examples, the first action may have been from a technical participant such as a member of the blue team 231. A role bot 221 that plays a technical role or other AI bot may be updated based on the first action and the assessment of the first action based on machine learning techniques, such as supervised machine learning techniques described herein. In still other particular examples, the first action may have been from the role bot 221 instantiated in the simulation run 222. In these instances, the actions from the role bot 221 may be used to further train that role bot 221.

At 320, the output interface 204 of the cyber range system 200 may transmit the updated AI bot for execution in the simulation run 222 or a subsequent simulation run.

Figure 4:
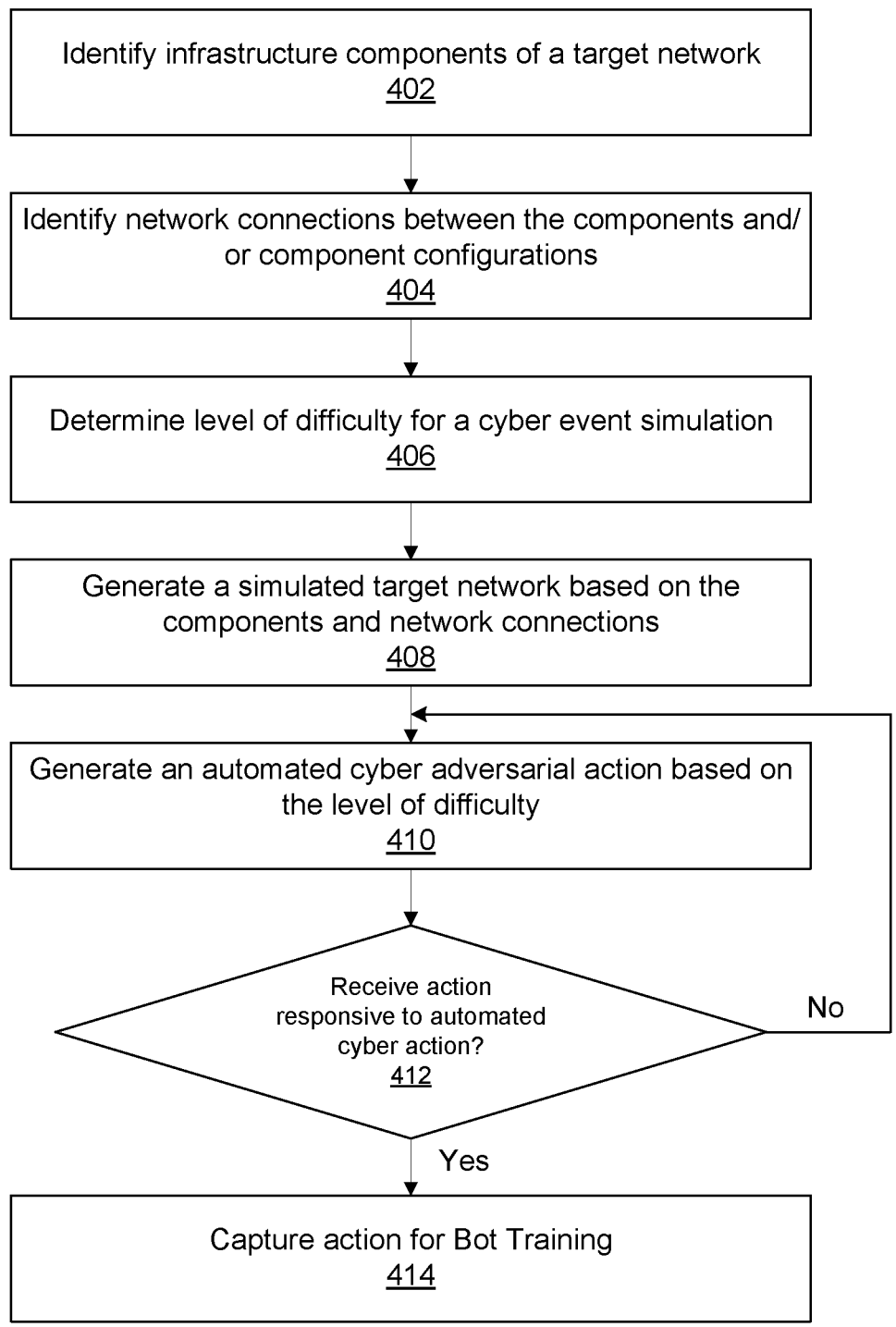
FIG. 4 illustrates a method for simulating a target network for the cyber range, according to an example.

FIG. 4 illustrates a method 400 for simulating a target network for the cyber range, according to an example. Although the method 400 is primarily described as being performed by system 100 as shown in FIG. 1 or system 200 as shown in FIGS. 1-2, the method 400 may be executed or otherwise performed by other systems, or a combination of systems. Each block shown in FIG. 4 may further represent one or more processes, methods, or subroutines, and one or more of the blocks may include machine-readable instructions stored on a non-transitory computer readable medium and executed by a processor or other type of processing circuit to perform one or more operations described herein.

At 402, the cyber range system 200 may identify infrastructure components of a target network 101. For example, the components may include various computing devices, network devices, and/or other devices of a computer network. At 404, the cyber range system 200 may identify network connections and/or component configurations of the components. At 406, the cyber range system 200 may determine a level of difficulty for a cyber event simulation.

At 408, the cyber range system 200 may generate a simulated network 201 based on the discovered components, connections, and configurations, and/or other discovered data.

At 410, the cyber range system 200 may generate an automated cyber adversarial action based on the level of difficulty.

At 412, the cyber range system 200 may determine whether an action was received that is responsive to the adversarial action. For example, the cyber range system 200 may correlate an action that was input to the simulation run 222 with the adversarial action based on respective timing of the action and the adversarial action.

At 414, the cyber range system 200 may capture the action for bot training if an action responsive to the adversarial action was received. The action may be stored in the benchmark and historian store 250A and/or may be provided to the training team 235 via the data access interface 202.

Figure 5:
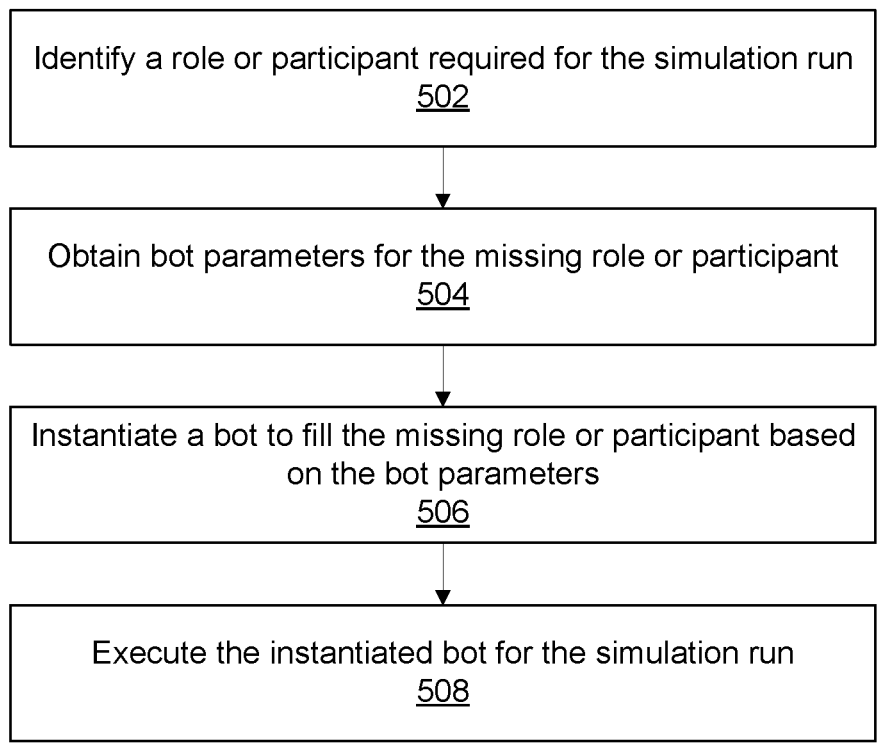
FIG. 5 illustrates a method for generating a role bot that takes the place of a human participant in the cyber range, according to an example.

FIG. 5 illustrates a method 500 for generating a role bot that takes the place of a human participant in the cyber range, according to an example. Although the method 500 is primarily described as being performed by system 100 as shown in FIG. 1 or system 200 as shown in FIGS. 1-2, the method 500 may be executed or otherwise performed by other systems, or a combination of systems. Each block shown in FIG. 5 may further represent one or more processes, methods, or subroutines, and one or more of the blocks may include machine-readable instructions stored on a non-transitory computer readable medium and executed by a processor or other type of processing circuit to perform one or more operations described herein.

At 502, the cyber range system 200 may identify a roe or participant required for a simulation run 222. For example, the simulation run 222 may specify a particular number and/or make-up of participants. In some examples, a scenario 224 used for the simulation run 222 may specify the participant number and/or make-up.

At 504, the cyber range system 200 may obtain bot parameters for a missing role or participant. For instance, the cyber range system 200 may determine that a particular participant having a specific role (such as a technical or non-technical role) is missing and obtain, from a data store, parameters that model a bot that has been computationally trained as described in this disclosure to play that role.

At 506, the cyber range system 200 may instantiate a bot to fill the missing role or participant based on the bot parameters. At 508, the cyber range system 200 may execute the instantiated bot for the simulation run 222.

FIG. 6 illustrates a method 600 for computationally training AI bots for the cyber range, according to an example. Although the method 600 is primarily described as being performed by system 100 as shown in FIG. 1 or system 200 as shown in FIGS. 1-2, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein.

At 602, the cyber range system 200 may segment non-technical and technical actions received during the simulation run 222. For example, the cyber range system 200 may segment the content by assigning each action received with contextual information.

At 604, the cyber range system 200 may label each of the actions for supervised machine learning. For example, the cyber range system 200 may provide each of the actions to the training team 235 so that they may label each action with an assessment of whether that action was appropriate, given the circumstance. The assessment may be binary (such as yes—appropriate or no—not appropriate) or may include levels such as a scale of appropriateness.

At 606, the cyber range system 200 may populate a benchmark and historian store 250A with each of the labeled actions. In some examples, the cyber range system 200 may further include contextual information associated with each of the actions. As such, the benchmark and historian store 250A may enable training of cross-contextual bots. At 608, the cyber range system 200 may train one or more bots based on the data in the benchmark and historian store 250A.

It should be appreciated that the data flows and methods described above are examples of scenarios provided by the systems 100 and 200 of FIGS. 1-2. Other examples or scenarios may also be contemplated. For instance, there may be a situation where functions and features of the systems 100 and 200 may be employed via a cloud application. The cloud application may then facilitate the data security and protection analysis as described herein.

It should be appreciated that the components of the system 100 described herein may operate in partial or full capacity, or it may be removed entirely. It should also be appreciated that cyber event training techniques described herein with respect to the cyber range system, for example, may also be performed partially or in full by other various components of the overall system.

Although applications described herein are directed mainly to cyber event training, it should be appreciated that that the systems may also use these and other various techniques in other types of incident response training including disaster recovery, first responder and first responder systems response, and other training or information management systems. The systems described herein may provide a more comprehensive, flexible and efficient approach to simulating cyber events, which may be applied to other types of training and response systems.

It should be noted that AI and machine learning as generally described herein throughout may refer to various types of systems that involve simulating and training intelligent behavior in computers. For example, broadly speaking, AI may include systems, programmed by computer instructions, that simulate human behavior. Machine learning may include computationally training of computers so that the computers may learn from observed data to alter its behavior. Machine learning may include deep learning techniques, which may involve training a computer based on labels. In various examples, the labels may include assessments, from the training team, of actions. For example, the systems may correlate a goal (e.g., a "good" assessment) to an action taken. The systems may further correlate deeper layers such as actions or context surrounding the action taken to make further correlations of how actions taken correlate to surrounding context or other actions. In this manner, deep learning techniques may model multiple layers of actions and context with a desirable outcome (a good assessment) to infer actions that should be taken, given a set of unlabeled data (such as data generated during a simulation or during a real-world cyberattack). Likewise, deep learning techniques may model multiple layers of actions and context with an undesirable outcome (a "poor" assessment) to infer actions that should be avoided, given a set of unlabeled data (such as data generated during a simulation or during a real-world cyberattack).

In some examples, the training may be based on dialog or conversation. For instance, a participant may be asked, during a simulation run, what the participant should do given the circumstance presented to the participant. The participant may follow-up with a response (whether spoken or text input). The response may be labeled with an assessment by the training team and used for deep learning. Follow-up questions may be posed to the participant, and follow-up responses may similarly be labeled and used for deep learning. In some examples, multiple responses or all of the responses from the dialog or conversation may be used for deep learning such that a dialog may include some responses that were assessed as good and other responses that were assessed as bad (although non-binary assessments may be used as well).

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

The invention claimed is:

1. A cyber event training system, comprising:
one or more data stores to store and manage data for a simulation run for cyber event training on a simulated network;
one or more hardware servers to facilitate operations using the data from the one or more data stores;
a cyber range subsystem that communicates with the one or more servers and the one or more data stores in the simulated network, the cyber range subsystem comprising:
a data access interface to:
receive data associated with each of a plurality of participants interacting with the simulation run;
a processor to:
generate the simulation run, the simulation run comprising a simulation of a target network, wherein a plurality of participants comprising at least one technical participant and at least one non-technical participant participates in the simulation run;
instantiate, within the simulation run, at least one Artificial Intelligence ("AI") role bot that simulates a non-technical participant or a technical participant;
generate one or more automated attacks in the simulation run;
receive a first action in the simulation run from a first participant of the plurality of participants, the first action responsive to the one or more automated attacks;
update the simulation run based on the first action;
receive a second action in the simulation run from a second participant of the plurality of participants, the second action in response to the updated simulation run;
receive, from a training team comprising one or more trainers, an assessment for at least one of the first action and the second action; and
update the at least one AI role bot based on the assessment; and
an output interface to transmit the updated at least one AI role bot for execution in the simulation run or a second simulation run.

2. The cyber event training system of claim 1, wherein the first action comprises a technical action from a technical participant.

3. The cyber event training system of claim 2, wherein the second action comprises a non-technical action from a non-technical participant.

4. The cyber event training system of claim 1, wherein the first action comprises a non-technical action from a non-technical participant.

5. The cyber event training system of claim 4, wherein the second action comprises a technical action from a technical participant.

6. The cyber event training system of claim 1, wherein the processor is further to:
store assessments of actions from multiple iterations of the simulation run; and
train the at least one AI role bot based on the stored assessments from the multiple iterations.

7. The cyber event training system of claim 6, wherein the processor is further to:
generate a playbook bot that provides advice in response to an actual cyberattack based on the at least one trained AI role bot.

8. The cyber event training system of claim 1, wherein to generate the one or more automated attacks, the processor is further to:
receive one or more orchestrated attacks to be performed in the simulation run from the training team; and
automatically execute the one or more orchestrated attacks in the simulation run.

9. The cyber event training system of claim 8, wherein the processor is further to:
receive one or more soft content from the training team, the soft content comprising questions to be answered by at least one of the plurality of participants;
provide the soft content to a recipient from among the plurality of participants;
receive a response to the soft content from the recipient; and
receive an assessment of the response from the training team, wherein the assessment of the response is used to train the at least one AI role bot or provide feedback to the recipient.

10. The cyber event training system of claim 1, wherein the processor is further to:
instantiate at least one personal assistant AI bot that provides advice to the first participant during the simulation run, the advice relating to at least the first action.

11. The cyber event training system of claim 10, wherein the at least one personal assistant AI bot advises a technical participant.

12. The cyber event training system of claim 10, wherein the at least one personal assistant AI bot advises a non-technical participant.

13. A method for providing cyber event training, comprising:
receiving data, at a data access interface, associated with each of a plurality of participants interacting with the simulation run;
generating, by a processor of a cyber range system that communicates with one or more servers and one or more data stores in a simulated network, the simulation run, the simulation run comprising a simulation of a target network, wherein a plurality of participants comprising at least one technical participant and at least one non-technical participant participates in the simulation run;

instantiating, within the simulation run, at least one Artificial Intelligence ("AI") role bot that simulates a non-technical participant or a technical participant;

generating one or more automated attacks in the simulation run;

receiving, via a data access interface, a first action in the simulation run from a first participant of the plurality of participants, the first action responsive to the one or more automated attacks;

updating the simulation run based on the first action;

receiving, via the data access interface, a second action in the simulation run from a second participant of the plurality of participants, the second action in response to the updated simulation run;

receiving, via the data access interface, from a training team comprising one or more trainers, an assessment for at least one of the first action and the second action;

updating, via the data access interface, the at least one AI role bot based on the assessment; and transmitting, via an output interface, the updated AI role bot for execution in the simulation run or a second simulation run.

14. The method of claim 13, wherein the first action comprises a technical action from a technical participant.

15. The method of claim 14, wherein the second action comprises a non-technical action from a non-technical participant.

16. The method of claim 13, wherein the first action comprises a non-technical action from a non-technical participant.

17. The method of claim 16, wherein the second action comprises a technical action from a technical participant.

18. The method of claim 13, further comprising:

storing, via a data store, assessments of actions from multiple iterations of the simulation run; and training the at least one AI role bot based on the storage of the assessments from the multiple iterations to update the at least one AI role bot.

19. The method of claim 18, further comprising:

generating a playbook bot that provides advice in response to an actual cyberattack based on the trained AI role bot.

20. The method of claim 13, wherein generating the one or more automated attacks comprises:

receiving one or more orchestrated attacks to be performed in the simulation run from the training team; and automatically executing the one or more orchestrated attacks in the simulation run.

* * * * *